J. S. WALSH.
HEADLIGHT.
APPLICATION FILED AUG. 23, 1913.
1,083,162.
Patented Dec. 30, 1913.
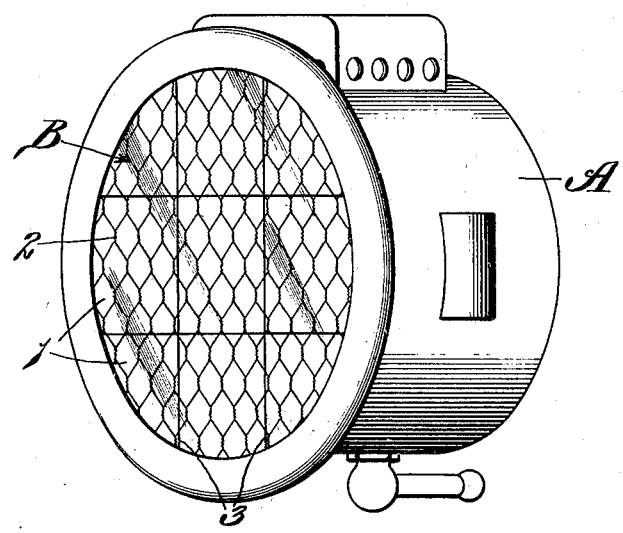
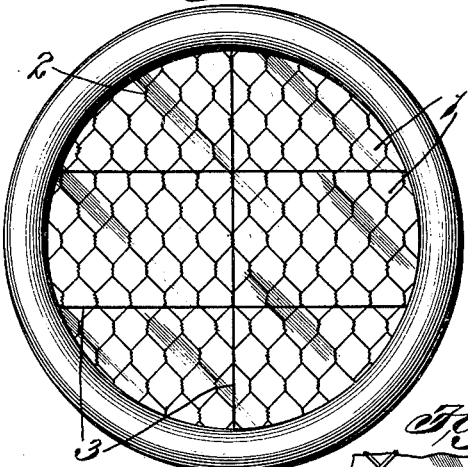
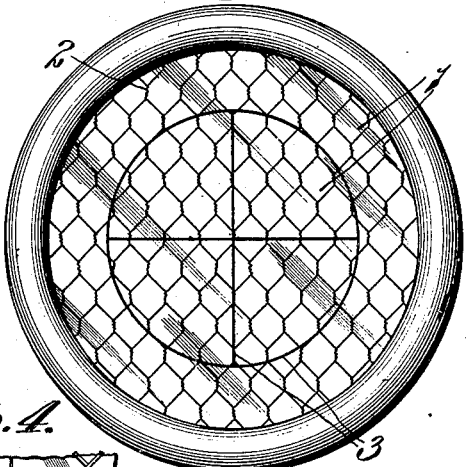
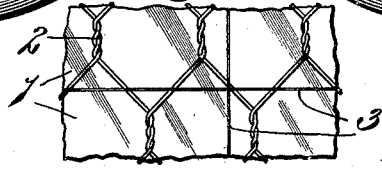
Witnesses:
Geo. R. Adson
C. M. Badger
Inventor,
Julius S. Walsh.
By Bakewell & Cornwell Attys.

UNITED STATES PATENT OFFICE.

JULIUS S. WALSH, OF ST. LOUIS, MISSOURI.

HEADLIGHT.

1,083,162.  Specification of Letters Patent.  Patented Dec. 30, 1913.

Application filed August 23, 1913. Serial No. 786,280.

*To all whom it may concern:*

Be it known that I, JULIUS S. WALSH, a citizen of the United States, residing at St. Louis, Missouri, have invented a certain new and useful Improvement in Headlights, of which the following is a full, clear, and exact description, such as will enable others skilled in the art to which it appertains to make and use the same.

This invention relates to headlights of the type that comprise a casing provided with a glass front for protecting the light arranged inside of the casing.

One object of my invention is to provide a headlight of the type mentioned in which the glass front is so constructed that it will not be liable to be injured or rendered useless by excessive heat or by vibration.

Another object is to provide a headlight in which the glass front is composed of independent sections that are joined or connected together in such a manner that one or more of the sections or the parts of a broken section cannot fall out of operative position and thus form a hole or opening in the glass front of the headlight.

Other objects and desirable features of my invention will be hereinafter pointed out.

Figure 1 of the drawings is a perspective view of an automobile headlight constructed in accordance with my invention; Figs. 2 and 3 are front elevational views illustrating other ways of dividing the glass front into sections; Fig. 4 is an enlarged view of a portion of the glass front of my improved headlight; and Fig. 5 is a cross sectional view of a portion of the glass front showing the embedded wire mesh that connects the sections of the glass front together.

Referring to the drawings which illustrate the preferred form of my invention, A designates the casing of a headlight of any particular type or design, and B designates the glass front which protects the light that is arranged inside of the casing A. The glass front B is composed of a plurality of independent sections 1, all of which are joined or connected together in such a manner that one section or the parts of a broken section cannot fall out of place and thus form a hole in the glass front through which air and dirt can enter the casing. It is immaterial so far as my broad idea is concerned, how the independent sections 1 of the glass front are united or connected to each other as my broad idea consists in a headlight of any type or design equipped with a glass front composed of a plurality of independent sections separated from each other by cracks or spaces and connected together in such a manner that there is no possibility of one section or the parts of a broken section dropping out of place. I prefer, however, to connect the sections 1 to each other by means of a piece of woven wire fabric 2 that is embedded in said sections during the operation of forming the glass, as shown in Fig. 5. The joints, cracks or spaces 3 between the sections 1 permit said sections to expand and contract, thus eliminating the possibility of the glass front becoming cracked or broken by excessive heat, and said joints or spaces 3 also eliminate the possibility of the glass front becoming cracked or broken by excessive vibration. The wire mesh or woven wire fabric 2 that is embedded in the sections 1 reinforces and strengthens the glass and prevents one or more of the sections or the parts of a broken section from separating and falling apart.

One convenient and inexpensive way of forming the glass front B of the headlight is to fit a piece of wire glass to the casing A and then before it is applied to the casing cut said glass into sections without breaking the wire mesh or woven wire fabric 2 that is embedded in the glass.

The particular shape and size of the sections 1 is immaterial so far as my invention is concerned. In the form illustrated in Fig. 1 the glass front B is provided with substantially square sections 1; in the form illustrated in Fig. 2 the glass front B is provided with substantially oblong-shaped sections 1; and in the form illustrated in Fig. 3 the glass front is composed of a substantially ring-shaped outer section and four substantially triangular-shaped sections arranged inside of same.

In a headlight of the construction above-described there is little liability of the glass front being rendered useless or becoming broken in such a way that air and dust can strike the light arranged inside of the casing of the headlight owing to the fact that the glass front is composed of independent sections that are not affected by vibration and by the expansion and contraction of the glass, said sections being joined or connected in such a manner that one section or the parts of a broken section cannot fall out of operative position.

While I have herein illustrated my invention embodied in an automobile headlight whose glass front is formed from a piece of wire glass divided into sections, I do not wish it to be understood that my invention is limited to any particular type of headlight or to any particular manner of connecting the independent sections of the glass front together.

It is to be noted that wire glass may be divided in the manner shown by simply cutting the same with an ordinary glass cutter and extending the crack formed by the cutter by tapping gently on the glass. In this manner the wire is not broken.

Having thus described my invention, what I claim as new and desire to secure by Letters Patent is:

1. A headlight provided with a glass front composed of independent sections that are joined or connected together by means embedded in said sections.

2. A headlight provided with a glass front composed of independent sections or pieces of glass, and means embedded in said sections and joining the meeting edge portions of the same together for preventing said sections from separating or the parts of a broken section from falling out of position.

3. A headlight provided with a glass front composed of a plurality of independent sections, and a reinforcing means embedded in said sections and operating to hold said sections in operative position with relation to each other without interfering with the relative movement of said sections caused by vibration and by contraction and expansion of the glass.

4. A headlight front consisting of a plurality of independent glass sections having a continuous wire mesh fabric embedded therein and connecting said sections.

5. A headlight provided with a glass front consisting of a plurality of independent sections arranged in vertical and transverse rows and having a continuous wire mesh fabric embedded therein and connecting said sections.

6. A headlight provided with a glass front that is made up of a plurality of independent sections or pieces of glass, and a flexible metallic means embedded in said sections to connect the meeting edge portions of said sections directly together so as to prevent one section or the parts of a broken section from falling out of operative position.

In testimony whereof I hereunto affix my signature in the presence of two witnesses, this 12th day of August 1913.

JULIUS S. WALSH.

Witnesses:
ELIZABETH C. STERRETT,
E. J. SMITH.

---

Copies of this patent may be obtained for five cents each, by addressing the "Commissioner of Patents, Washington, D. C."